(12) United States Patent
Shimizu (10) Patent No.: US 6,557,999 B1
(45) Date of Patent: May 6, 2003

(54) SYSTEM AND METHOD FOR CONTRAST ENHANCEMENT IN PROJECTION IMAGING SYSTEM

(75) Inventor: Jeffrey A. Shimizu, Cortlandt Manor, NY (US)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 09/713,854

(22) Filed: Nov. 16, 2000

(51) Int. Cl.[7] .............................................. G03B 21/14
(52) U.S. Cl. ............................................. 353/20; 349/9
(58) Field of Search ................... 353/20, 122; 348/767, 348/834, 835; 349/8, 9

(56) References Cited

U.S. PATENT DOCUMENTS 5,268,775 A * 12/1993 Zeidler ................... 353/122 X
5,786,934 A    7/1998 Chiu et al. .................. 359/494
6,022,110 A * 2/2000 Tsujikawa ..................... 353/20

FOREIGN PATENT DOCUMENTS

| EP | 0 773456 A2 | 5/1997 |
| JP | 10-161120 | 6/1998 |
| JP | 11-160791 A | 6/1999 |

* cited by examiner

Primary Examiner—W. B. Perkey
(74) Attorney, Agent, or Firm—Aaron Waxler (57) ABSTRACT

An image projection system having a reflective imaging device and a projection device, characterized in that a quarter wave plate is provided between the reflective imaging device and projection lens in such manner as to suppress reflections from the projection lens from reaching the reflective imaging device while minimizing reflections from its own surface reaching the reflective imaging device. Preferably, the quarter wave plate is laminated to a polarizing beamsplitter exit face or to an optional linear polarizer sheet, to eliminate an air interface.

19 Claims, 4 Drawing Sheets

SYSTEM AND METHOD FOR CONTRAST ENHANCEMENT IN PROJECTION IMAGING SYSTEM

FIELD OF THE INVENTION

The present invention relates to the field of projection imaging systems, and more particularly to a system and method for reducing stray light in a projection system in order to improve projected image contrast.

BACKGROUND OF THE INVENTION

In Reflective LCD projection displays, also known as a liquid crystal on silicon (LCOS) display, a polarizing beamsplitter (PBS) is often used to separate the illumination, off light, and projected image beams. Great effort goes to maximizing system contrast ratio of white to dark. Most of the effort is directed towards the PBS, the RLCD panel, and other polarization optics near the panel. The effort is toward creating a good dark state when tie entire panel is driven to black.

In addition to full white to full black (sometimes called sequential) contrast, intrascene or checkerboard contrast significantly impacts picture quality. The projection lens is a key element for checkerboard contrast. As such the lens alone is often designed and tested for checkerboard contrast, or ghost images. In a reflective LCD system this is not enough. The reflections from the lens elements are reflected back towards the panel and can again be reflected forward. The result is a loss of checkerboard contrast and in some cases results in fairly strong ghost images.

In order to reduce the ambient reflection, one of a conventional techniques is by use of a circular polarizer, which reduces the reflection of the ambient light because the reverse of the handedness of polarization in reflection. The reduction of ambient reflection is significant. But for a high quality color display system, particularly for the high performance system utilizing the on-axis or near on-axis virtual image techniques, the reduction is still not adequate.

Ziegler discloses in U.S. Pat. No. 4,657,348 entitled "Arrangement to Remove Reflection from Liquid Crystal Displays (LCDs)" (issued on Apr. 14, 1987), expressly incorporated herein by reference, an optical arrangement to remove reflection from LCD display by employing a cover disk in front of the LCD, which is disposed obliquely to and apart from the LCD. A quarter wave retarding foil is disposed on the liquid crystal cell. The cover disk includes a polarizer, The quarter wave foil cooperates with the polanier to substantially remove the reflection from the light passing through the cover disk. Application of the polarizer together with the quarter wave ($\lambda$/4) plate to remove the ambient reflection is thus well known in the art. However, such technique imposes several limitations for modem display devices, particularly for the virtual image color display systems. First of all, for a virtual image display, the blocking of the ambient reflection by this conventional method also reduces the brightness of the image display. It is caused by the reduction of the image reflection by the poplarizer and the $\lambda$/4 retarding foil.

U.S. Pat. No. 5,786,934, (issued on Jul. 28, 1998, Chiu et al.), and U.S. Pat. No. 5,621,486 (issued Apr. 15, 1997, Doany et al.), each entitled "Efficient Optical System for a High Resolution Projection Display Employing Reflection Light Valves" (issued on Jul. 28, 1998, Chiu et al.), expressly incorporated herein by reference, provides an image projection system including a quarter wave plate positioned to suppress stay reflection from the projection lens.

U.S. Pat. No. 5,831,712, entitled "Optical Apparatus Having Ocular Optical System" (issued Nov. 3, 1998, Tabata et al.), expressly incorporated herein by reference, discloses a liquid crystal display device including a beam splitter prism, having quarter wave plates at its surfaces to suppress ghost images from ambient light.

U.S. Pat. No. 6,088,067, provides a "Liquid Crystal Display Projection System Using Multilayer Optical Film Polarizers".

U.S. Pat. No. 5,278,532, entitled "Automotive Instrument virtual Image Display" (issued on Jan. 11, 1994, Hegg et al.) discloses a virtual image automotive instrument display system.

EP 0 991 281 A2 (20000504) relates to a projection-type display device having a beamsplitter prism, having a polarization filter as an analyzer at its output to block transmission of undesired light of a particular polarization axis.

JP-11015074 A (19990122) relates to a projected type color image display device for a liquid crystal projector having a selective reflector in the form of a sheet as an analyzer, which transmits only linearly polarized light components irrespective of incidence angle and reflects orthogonally crossing polarized light components.

JP-2000098322 A (20000314) relates to a liquid crystal projector having three liquid crystal panels to form an image of each color, with a dichroic prism including a quarter wave plate disposed after a lens on its output side.

JP-2000075246 A (20000314) relates to a projection-type display device, having a polarized plate arranged between a polarized beamsplitter and projection lens as an analyzer, so that reflected polarized light incident on the beamsplitter is absorbed.

JP-11352478 A (19991224) relates to a color light separator assembly in a liquid crystal projector for color image formation, having a polarizing plate to reflect blue light toward a prism having a quarter wavelength sheet on various surfaces, including the output surface facing toward the projection lens.

Image projection systems often provide a liquid crystal spatial light modulator (SLM), which requires illumination with a high intensity polarized light source. It is desirable to maintain a high contrast ratio, and internal reflections from the high power light source typically lead to stray light, which results in loss of contrast. When the internal reflections or stray light form an image in a focal plane of the system, ghost images often result. Although the lens elements of the projection lens are provided with anti-reflective coatings, and thus reflect but a very small percentage of light impinging thereon, even this small percentage of reflected light from the high brightness source is sufficient to be reflected by the OFF state of the SLM back onto the projection screen. This causes ghosts, which are, for example, unwanted weaker replications, which may be transformed, of the modulated image pattern, and are most noticeable in black areas of the screen when only a portion of the screen is white. The unwanted ghost is that portion of light retroreflecting from the air glass interface of a lens element, which then forms a focused image on the SLM surface. This image is reflected by the liquid crystal light valve through the lens and continues onto the screen. The problem is related to the lens element surface of all lenses that form images back onto the SLM, which then are imaged by the projection lens onto the screen. Even those surfaces that do not image may still result in stray light leading to loss of image contrast.

Accordingly, it is an object of the present invention to provide an image projection system reflective liquid crystal light valve projection system which avoids or minimizes above mentioned problems.

In is known to reduce internal reflections in image projection systems by changing the polarization state of such light so as to prevent it from being re-transmitted back through the polarizing beam splitter of the system. More specifically, a quarter wave plate may be positioned between the polarizing beam splitter and the projection lens, whereby light transmitted from the polarizing beam splitter to the lens obtains a circular polarization by the quarter wave plate, and light reflected from the lens back toward the polarizing beam splitter has a circular polarization of opposite handedness, resulting in light having an opposite linear polarization from the incident beam. The light then passes again through the quarter wave plate, resulting in light having a linear polarization with an axis opposite the original beam. This light is reflected away from the light valve by the polarizing beam splitter.

Figure 1:
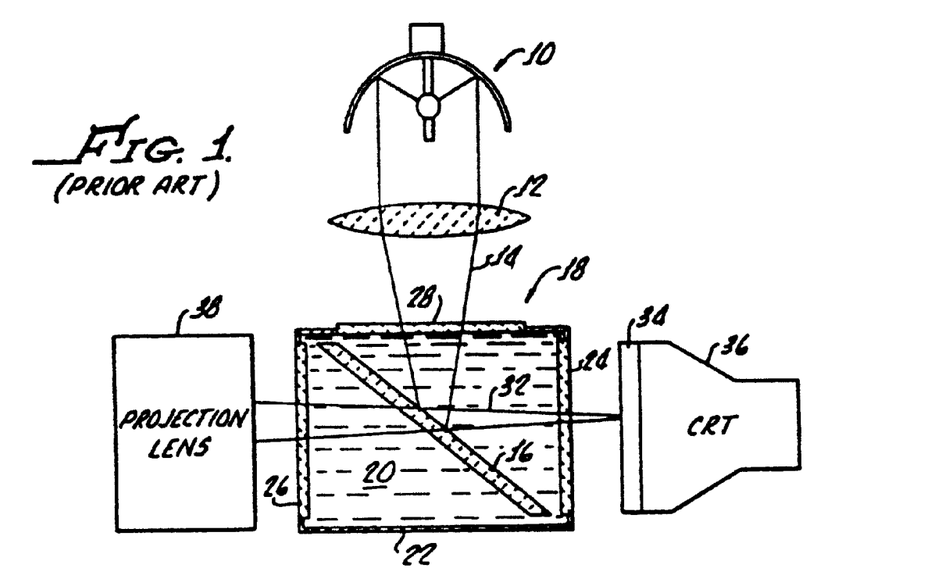
FIG. 1 shows a prior art MacNeille prism liquid crystal light valve projection system.

FIG. 1 illustrates a prior art liquid crystal light valve projection system, for example described in Ziedler, U.S. Pat. No. 5,268,775, expressly incorporated herein by reference, which is itself of the type generally shown in U.S. Pat. No. 4,343,535 to Bleha, Jr. and U.S. Pat. No. 4,650,286 to Koda, et al. This projection system embodies a high power light source, such as a high brightness arc lamp 10, emitting unpolarized light that is transmitted through a collimating lens 12 which directs the light beam 14 to a polarizing beam splitter 18, shown as an embedded version of a MacNeille prism. The polarizing beam splitter 18 includes an input window 28 through which it receives randomly polarized light from arc lamp source 10. In general, the beam splitter transmits light of one polarization state, such as the "P" polarization state for example, and reflects light of another polarization state, such as the polarization state "S", for example. Reflected light of S polarization state travels along a reflected beam 32 to a modulated liquid crystal light valve 34. In one modulation state, the corresponding area of the light valve 34 remains in an off or dark state, and light is retroreflected from the dark part of the light valve 34 back to the polarizing beam splitter with its polarization state unchanged. Because the polarization of the light is unchanged from its original S state, light is again reflected from the beam splitter prism plate and returns to the light source 10, and not to the projection lens 38, so that the corresponding projected image regions remain dark. For those areas of the liquid crystal light valve that are modulated in the on state, some or all of the light reflected from such bright areas of the light valve 34 is rotated from S polarization slate to P polarization state. The retroreflected light of the polarization state P is transmitted from the liquid crystal light valve through the polarizing beam splitter 18, passing through the beam splitter exit window 26 and projection lens 38 to form a bright image portion.

Figure 2:
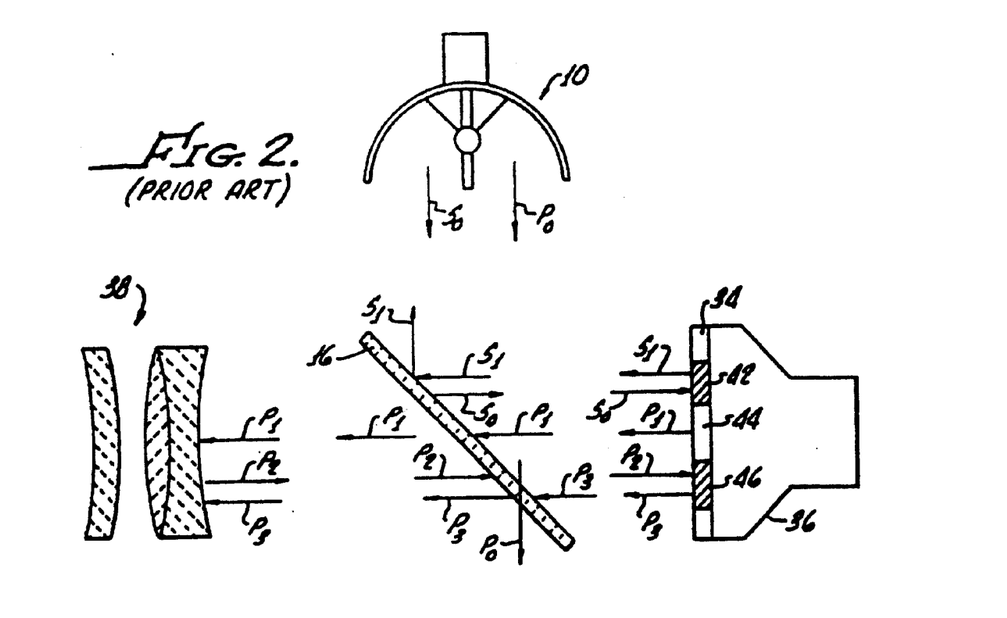
FIG. 2 shows a diagram of the system depicted in FIG. 1, showing various polarization states of the light reflected among the system elements.

FIG. 2 is a simplified showing of the system of FIG. 1, schematically indicating transmission and reflection of light rays of the various polarized states and arranged to illustrate certain aspects of the manner in which a ghost image or decrease in contrast may occur in this reflective liquid crystal light valve projection system. In the simplified illustration of FIG. 2 no attempt is made to show angles of reflection of individual light rays, but arrows designated S or P with suitable subscripts are employed to illustrate the transmission and reflection of light components of polarization states S and P respectively. As schematically illustrated in FIG. 2, the high intensity arc lamp 10 transmits unpolarized light or light of random polarization indicated by the rays $S_0$ and $P_0$ to polarizing beam splitter 16. The latter transmits light of polarization state $P_0$, as indicated in the drawing by arrow $P_0$, and reflects light of S state polarization, as indicated by the arrows $S_0$. Where the S state light $S_0$ impinges upon a dark area (corresponding to a dark area of the cathode ray tube), such as area 42 of the liquid crystal light valve 34, it is reflected without change of polarization, as indicated by the $S_1$ component, which is transmitted to the beam splitter from which it is reflected back toward the arc lamp. Where the light of polarization state S impinges upon a light area 44 of the liquid crystal light valve, such as indicated by $S_0$, it is reflected with a polarization state $P_1$ to the beam splitter. The latter transmits the light component $P_1$ of polarization state P to lens 38. This is the light that is intended to be projected by the lens system on to the screen. That is, all of the light reflected with polarization state P from the light areas of the liquid crystal light valve is desirably transmitted through the lens to the screen. However, as mentioned above, a small amount of light impinging upon the surfaces of the lens elements is reflected back toward the beam splitter, as indicated by component $P_2$. This light of polarization state P is transmitted back through the beam splitter and may impinge upon various areas of the liquid crystal light valve, depending upon the curvature of the lens and the angle of the various light rays received by the lens.

Light of polarization state P reflected from the projection lens, as indicted by arrows $P_2$, may impinge upon the dark areas, such as a dark area 46 of the liquid crystal light valve, from which it is retroreflected without change of polarization state as a light component indicated as $P_3$ in FIG. 2. The components of retroreflected light $P_3$, from the "dark" areas of the liquid crystal light valve, pass through the beam splitter back toward the lens system and are transmitted through the lens system (except for the very small percentage that once more is reflected from the lens element's surfaces) to the screen where they form a ghost image of the arc lamp and increase intensity of illumination of ideally darker areas on the projection screen, thereby diminishing contrast.

The following discussion may aid in understanding the problem presented by lens element reflection. The normal screen image is composed of light that emanates from the arc lamp, illuminates the light valve surface and is reflected selectively through the projection lens and on to the screen. The objectionable ghosts, with which the present invention is concerned, are unwanted reflections of the modulated image at the projection screen, and are most noticeable in black areas of the screen when only a portion of the screen is white.

Unlike the classical ghost image, which is the unwanted image of a star like point object, this ghost image is that of an extended source at the screen. The unwanted ghost is that portion of light re-reflecting from the air-glass interface of a lens element's surface and which then forms a focused image of the back-reflected modulated image on the light valve surface. This image is then reflected by the valve through the lens and continues on to the screen. Even though broad band anti-reflection coatings help in controlling ghost images, the brightness of the arc lamp is so great that even a fraction of a percent of reflection is visibly noticeable at the screen.

Figure 3:
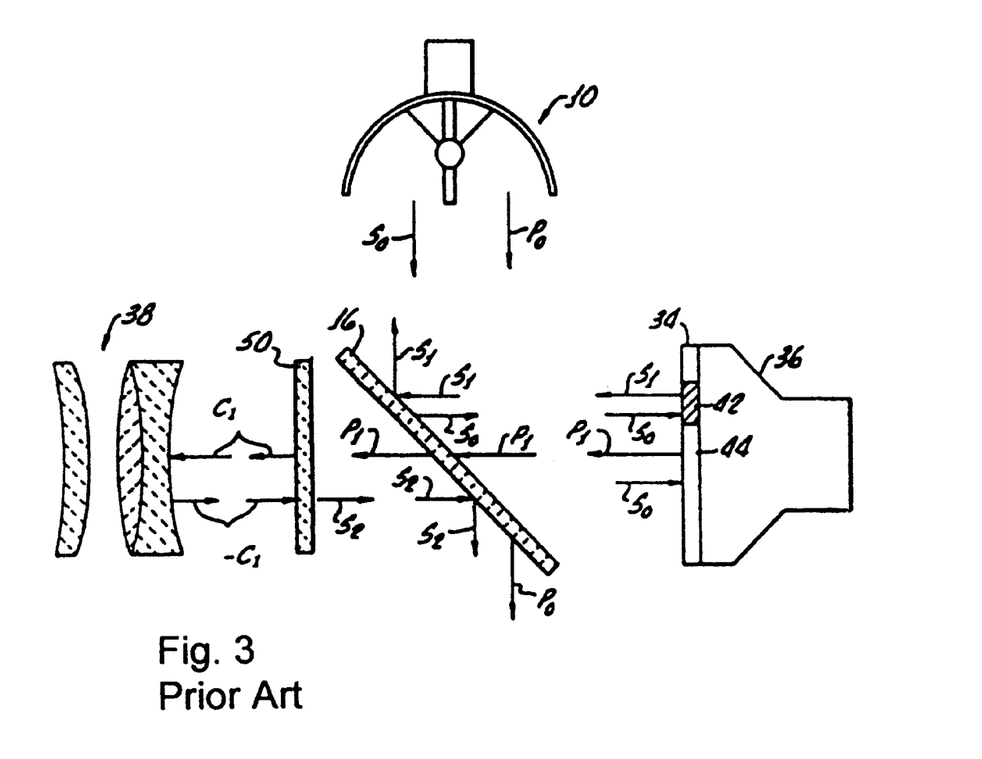
FIG. 3 shows a prior art liquid crystal projection system with a quarter wave polarization plate interposed between the polarizing beam splitter and the projection lens.

According Ziedler, U.S. Pat. No. 5,268,775, expressly incorporated herein by reference (hereinafter referred to as "Ziedler"), the problem described above is resolved, as illustrated in FIG. 3, by interposing a quarter wave plate 50 between the beam splitter and the lens 38. The plate 50 is a broadband one-quarter wave plate with its axis oriented at 45° to the linear polarization axis, to provide a circular polarization of the light upon transmission. It is active upon a broadband of visible frequencies. Light of P state polarization, indicated by components $P_1$ are retroreflections, with changed polarization state, of the S polarization state light $S_0$ impinging upon light areas 44 of the liquid crystal light valve 34. These components $P_1$, as in the arrangement of FIG. 2, pass through the beam splitter and thence through the quarter wave plate 50 (FIG. 3). The quarter wave plate converts the P polarization state light to a circular polarization state, to provide light components designated in the drawing of FIG. 3 as $C_1$. A small portion of light of the polarization state $C_1$ then is reflected from the rear surfaces of elements of lens 38, in a manner similar to that previously described, an opposite circular polarization. This is indicated in the drawing of FIG. 3 as component $-C_1$. The component $-C_1$ reflected from the lens passes through the quarter wave plate 50 a second time, and converted to linear polarized light having a 90° polarization shift, which effectively changes the polarization state to S, as indicated in the drawing by the component $S_2$. Components of polarization state $S_2$ are not transmitted through the beam splitter but, to the contrary, are reflected away from the liquid crystal valve and out of the system. Thus by changing the polarization state of the light from the liquid crystal light valve after the light passes through the beam splitter, even these faint reflections from the surfaces of the lens elements are prevented from reaching the liquid crystal light valve. The polarization state of light reflected from the lens is changed so that it cannot be transmitted through the beam splitter. Accordingly, this source of ghost image and contrast diminution is eliminated.

As stated above, the contrast of the known optical system is improved by quarter wave plate incorporating a thin birefringent layer or layers placed between the projection lens and the polarizing beam splitter for the reduction of the possibility of light reflected back into the optical system by the surface of the lens elements being reflected back again to the screen. Light going through the quarter wave retardation plate or film system toward the lens and then reflected back through the film a second time will have its polarization direction effectively rotated by 90° and thus will be removed from the optical system by the polarizing cube.

Figure 4:
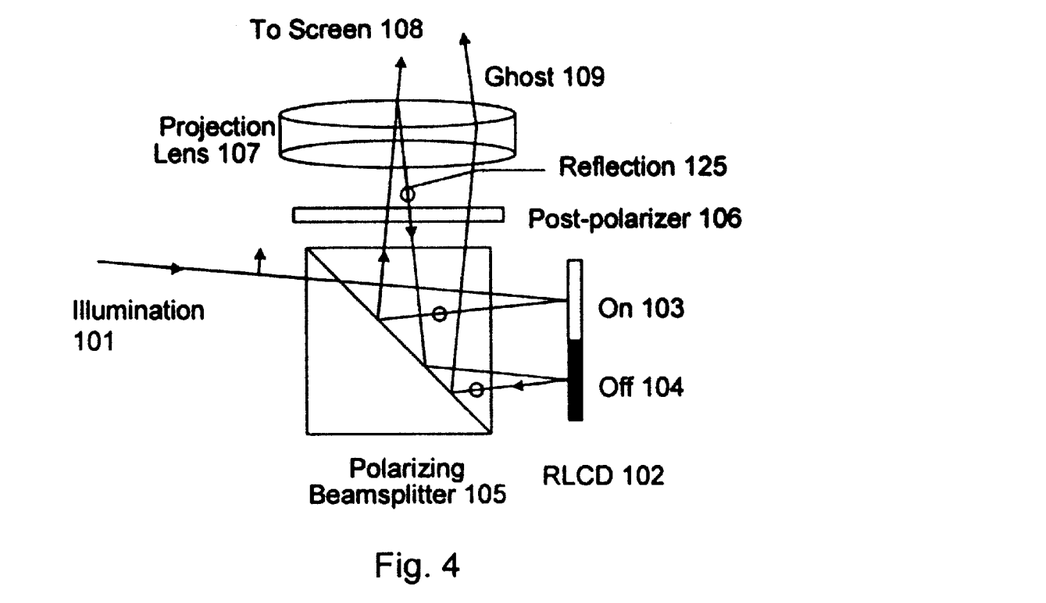
FIG. 4 shows a prior art polarizing beam splitter prism liquid crystal image projection system.

FIG. 4 shows an alternate prior art system including a polarizing beamsplitter (PBS) prism. In this system, discussed further below, the projection lens optics generate reflections which are imaged on the surface of the image panel, and thus are further projected in like manner to the intended image information. These reflected images are seen as ghost images on the projection screen.

SUMMARY OF THE INVENTION

According to the present invention, a quarter wave foil is inserted into the projection path before the projection lens. The axis of the foil is at 45 degrees to the, projected polarization axis. The quarter wave foil along with the PBS and optional post polarizer, serve to prevent reflections from the projection lens from reaching the RLCD panel. This eliminates a source of ghost images and contrast limiting back reflections.

Ziedler differs from the present invention in that, while Ziedler seeks to block reflections from the projection lens, it does not abate reflections from the quarter wave plate itself, and these would be produced, to some extent, despite addition of an antireflective coating. Since the quarter wave plate is not in the focal plane, these reflections are seen as a loss of contrast and increase in black level.

The data provided in Ziedler clearly infer that, indeed, significant reflections remain. For example, Ziedler cites an increase in contrast from 36:1 to 105:1, 43:1 to 110:1, and 38:1 to 54:1. In fact, the data demonstrates between a 1.5:1 and 3:1 improvement in contrast, and therefore leaving approximately between about 33%–66% of stray light. This contrast data, however, does not address ghost images directly, since the stray light is not uniformly present in the projected image, and which ghosts were found to be objectionable in a prototype system lacking the improvements according to the present invention.

The present invention therefore proposes that the quarter wave foil be laminated to the face of the prism, or to a linear polarization filter in the optical path. This lamination eliminates a separate air-interface surface, and therefore effectively eliminates reflections that would be generated at such an interface. Therefore, the present invention suppresses the rays reflected from the projection lens system without substantially creating reflections of its own. Thus, the ghosts that were present in the prototype system were essentially eliminated. This goal was achieved without an antireflective coating on the quarter wave foil, and without introducing other apparent artifacts or limitations in the system.

It is therefore an object according to the present invention to provide an image projection system having a polarized beamsplitting prism, a reflective imaging device, and a projection device, characterized in that a quarter wave plate is provided between the polarized beamsplitting prism and projection lens in such manner as to suppress reflections from the projection lens from reaching the reflective imaging device while minimizing reflections from its own surfaces reaching the reflective imaging device.

Preferably, the quarter wave plate is laminated to the polarizing beamsplitter exit face or to an optional linear polarizer sheet, to avoid an air interface. Preferably, all refractive air interfaces in the system transmitting light are antireflection coated.

It is a further object of the invention to provide a method of reducing internal reflections within a PBS image projection system, comprising the steps of laminating a polarizing filter to a face of the PBS with an optical quality adhesive to thereby eliminate a pair of refractive air interfaces.

These and other objects will be apparent from a review of the drawings and detailed description of the preferred embodiments.

DETAILED DESCRIPTION OF THE PREFERRED EMBODIMENT

A common arrangement for a reflective LCD projection system is shown in FIG. 4. This system, and other implementation details, are described in more detail in U.S. Pat. No. 5,532,763, Janssen, et al. (Jul. 2, 1996), expressly incorporated herein by reference. Light of one polarization (as shown "p" polarized) transmits through the PBS 105 and illuminates the RL,CD panel 102. In this case the panel 102 is bright in one area 103 and black 104 in the other. In the bright area 103, the polarization of the incident light is changed to "s" and is reflected from the PBS 105 to the projection lens 107 and onto the viewing screen 108. In the dark region 104 of tie picture, the polarization state is unchanged. The reflected p-polarized light passes through the PBS 105 back towards the illumination system 101.

The projection lens 107 typically consists of many elements. Each element reflects some light backwards. Antireflection coatings are used to reduce the amount of reflection but there is always a finite reflection. Reflection 125 from a lens surface is shown in FIG. 4. The reflection 125 maintains the s-polarization. Reflected light from the lens is passed through the PBS 105 back onto the panel 102. When light strikes a dark region 104, die panel 102 will reflect the light with no change in polarization state. This light is still s-polarized and will be passed by the PBS 105 back through the projection lens 107 and onto the viewing screen 108. If the lens 107 surface is nearly confocal to the panel 102, a reasonably coherent ghost image of the bright area is seen on the opposite side of the image in the black area. For surfaces that are not confocal, background light is generated over the image, raising the black level and degrading intra-scene contrast.

Figure 5:
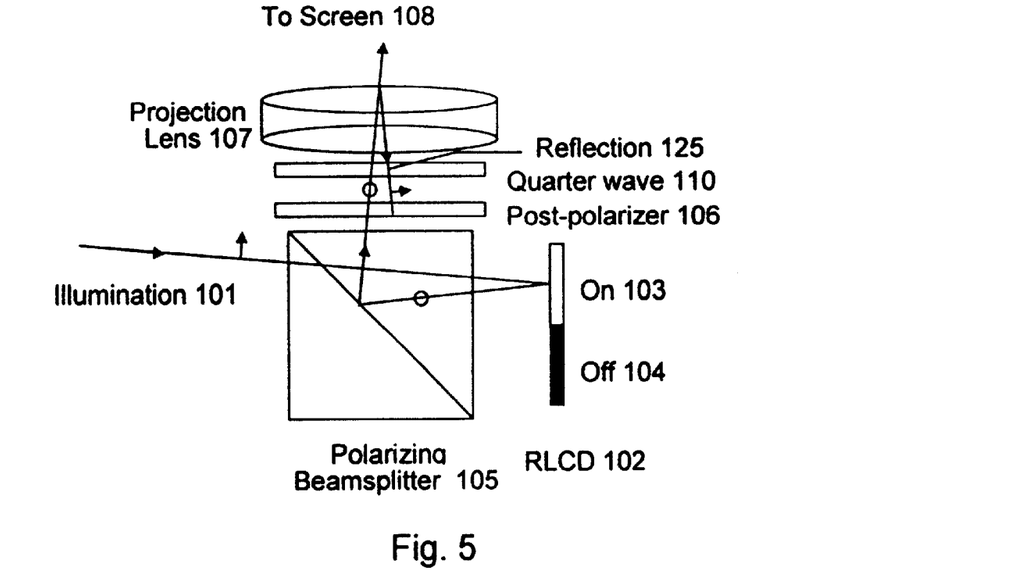
FIG. 5 shows an improved polarizing beam splitter prism liquid crystal image projection system according to the present invention having a quarter wave foil and optional linear polarizer sheet located between the polarizing beam splitter prism and the projection lens.

The present invention addresses these reflections 125 by adding a quarter-wave foil 110 into the projection path after the PBS 105 and before the projection lens 107, as shown in FIG. 5. The post-polarizer 106 passes s-polarized light. The quarter wave foil 110 is inserted after the post-polarizer 106, and before the projection lens 107. The axis of the quarter wave foil 110 is inclined 45° relative to the post-polarizer 106 or s-axis. The combination of a polarizer 106 and quarter wave foil 110 serves as an optical isolator, which eliminates reflection 125. The projected s-polarized light becomes, for example, left hand circular polarized. Light reflected from a projection lens 107 surface becomes right hand circular polarized. The right hand circular polarized light becomes P-polarized (90° shifted) alter passing back through the quarter wave foil 110. The p-polarized light is then absorbed at the post-polarizer 106, or in its absence, is transmitted away from the RLCD panel 102 by the PBS 105.

There is effectively no penalty for implementation of this solution. The transmission efficiency of a quarter wave foil 110 is very high, so there is virtually no insertion loss. When laminated to the PBS 105 surface or to a post-polarizer 106, there are no additional air interface surfaces. The only effect is that the projected light is now circularly polarized rather than linearly polarized.

The arrangement according to the present invention has been tested. The prototype system, absent the quarter wave foil, exhibited a strong ghost image mirrored about the optical axis. This ghost was quite noticeable in some scenes and degraded picture quality. By inserting the quarter wave as described herein, this ghost image disappeared. This disappearance of the ghost by insertion of the quarter wave foil from a dark test pattern implies a diminution in reflection intensity of at least one order of magnitude, significantly higher than the overall contrast improvement seen by Ziedler.

Alternatives to the arrangement described above are possible. The system may not have a post polarizer 106. In this case the PBS 105 itself in combination with the quarter wave foil 110 produces the desired effect. The quarter wave foil 110 could be laminated to the exit surface of the PBS 105. In this case the reflection from the PBS 105 exit surface is also eliminated. The arrangement works equally well if the illumination path is upon reflection and the projected light is transmitted through the PBS 105.

Therefore, it is apparent that the present invention provides an optical isolator to the exit of the polarizing beamsplitter prism, to prevent once reflected light from the projection lens from reaching the imaging device. Multiply reflected light will be greatly attenuated, and is thus of lesser importance.

Figure 6:
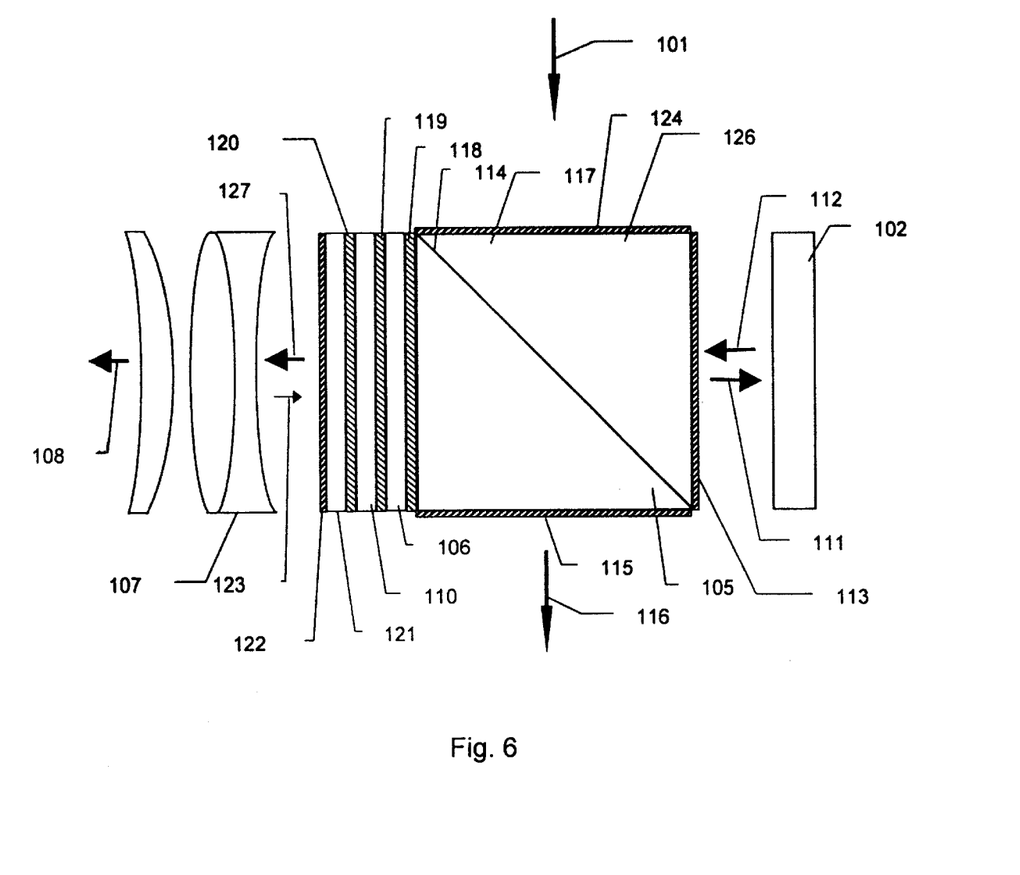
FIG. 6 shows a detailed cross sectional view of a polarizing beamsplitter and polarizing filters laminated together to eliminate excess refractive air interfaces.

As shown in FIG. 6, the quarter wave foil 110 may be laminated to the polarizing beamsplitter (PBS) 105. This embodiment eliminates refractive air interfaces, and thus reduces problematic reflections. According to the embodiment of FIG. 6, a linear polarizer sheet 106 is laminated to the PBS 105 using an optical adhesive or pressure-sensitive adhesive (PSA) 118. This face of the PBS 105 is preferably uncoated, while the remaining external faces are preferably antireflection coated 122, 115, 113, 124. Further, the quarter wave foil 110 is laminated to the linear polarizer sheet 106 using an optical adhesive or PSA 119. The quarter wave foil 110 is further laminated to an antireflective-coated cover sheet 121, using an optical adhesive or PSA 120. Thus, since the PBS 105 exit face is preferably antireflective coated in any case, no additional coated surfaces are required, and no additional refractive air interfaces are present.

Normally, a MacNeille PBS 105 has limited efficiency, and thus a small portion of light having an undesired polarization axis exits. In addition, the PBS 105 has angular sensitivity. By providing a linear polarizer 106 within the light exit path, a net improvement in contrast is seen, even without employing a quarter wave foil 110. By combining this linear polarizer 106 with the quarter wave foil 110, the reflection 125 is extinguished with high efficiency.

The method for laminating polarizer to the PBS comprises the steps of providing a PBS 105 or PBS-half prism 117, with an uncoated face, providing an optical adhesive or optical-grade pressure sensitive adhesive 118 either on the polarizer 106 or on the PBS 105 surface, and adhering the polarizer sheet 106 to the PBS 105. The PBS is constructed in known manner from two prism halves, 117, 126 having an intervening coating 114 on one of the halves 117, 126. These steps may be performed multiple limes to create a stack of optical elements 105, 106, 110, 121. In order to provide an antireflective optical coating 122 on the ultimate refractive air interface, the final sheet may be antireflective coated, or a cover sheet 121 provided as one of the layers in the laminate, having an optical antireflective coating 122.

Thus, illumination 101 from the projection lamp having p-polarization 116 passes through the PBS 105. On the other hand, s-polarized light is reflected by the coating 114 toward the RLCD panel 102, which forms a reflected modulation pattern 112. Since this light 127 has a changed polarization state, it passes directly through the PBS 105 without reflection, and through the layers 106, 110, 121 on the exit face of the PBS 105, toward the projection lens 107. A portion 123 of this light is reflected from surfaces of the projection lens 107, while the remainder 108 is directed toward the projection screen.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

What is claimed is:

1. An image projection system, comprising:
   (a) a reflective spatial image modulator;
   (b) an image projection lens, having a reflective interface producing ghost images on said reflective spatial image modulator; and
   (c) an optical isolator, for restricting reflections from said image projection lens from reaching said reflective spatial image modulator, wherein said optical isolator is capable of restricting reflections from said optical isolator from reaching said reflective spatial image modulator.

2. The image projection system according to claim 1, wherein said optical isolator comprises a quarter wave foil cooperating with a linear polarizer, disposed between said reflective image modulator and said image projection lens, wherein said quarter wave foil and said linear polarizer are capable of restricting reflections from said quarter wave foil and said linear polarizer from reaching said reflective spatial image modulator.

3. The image projection system according to claim 1, further comprising a polarizing beamsplitter, disposed to receive illumination, direct a portion of the received light toward tile reflective spatial image modulator, receive a reflected image from the reflective spatial image modulator, and direct the reflected image toward the image projection lens.

4. The image projection system according to claim 3, wherein said optical isolator comprises a quarter wave foil laminated to a face of said polarizing beamsplitter.

5. The image projection system according to claim 3, wherein said optical isolator comprises a quarter wave foil disposed between said polarizing beamsplitter and said image projection lens and a linear polarizer disposed between said polarizing beamsplitter and said quarter wave foil, wherein said quarter wave foil and said linear polarizer are capable of restricting reflections from said quarter wave foil and said linear polarizer from reaching said reflective spatial image modulator.

6. The image projection system according to claim 3, wherein said optical isolator comprises a quarter wave foil disposed between said polarizing beamsplitter and said image projection lens and a linear polarizer disposed between said polarizing beamsplitter and said quarter wave foil, wherein said quarter wave foil and linear polarizer are laminated together, and wherein a combination of said laminated quarter wave foil and said laminated linear polarizer is laminated to said polarizing beamsplitter.

7. The image projection system according to claim 1, wherein said image projection lens has a surface which is confocal to said reflective spatial image modulator.

8. A method of reducing ghost reflections in an image projection system, comprising the steps of:
   (a) receiving projection illumination;
   (b) providing a linearly polarized portion of the projection illumination on a reflective spatial image modulator;
   (c) modulating an image comprising the linearly polarized portion of the projection illumination;
   (d) directing the modulated image through a circular polarizer oriented at 45° to the linear polarization axis, toward a projection lens having a reflective surface;
   (e) passing a reflected portion of the modulated image from the projection lens through the circular polarizer, resulting in a net rotation of 90°;
   (f) restricting transmission of light presented from the projection lens toward the spatial image modulator having a relative 90° rotation with respect to the linearly polarized portion of the projection illumination; and
   (g) restricting reflections from a surface of said circular polarizer from reaching said reflective spatial image modulator.

9. The method according to claim 8, wherein the image projection system comprises:
   (a) a reflective spatial image modulator;
   (b) an image projection lens, having a reflective interface producing ghost images on said reflective spatial image modulator;
   (c) a polarizing beamsplitter, disposed to receive illumination, direct a portion of the received light toward the reflective spatial image modulator, receive a reflected image from the reflective spatial image modulator, and direct the reflected image toward the image projection lens; and
   (d) an optical isolator, for restricting reflections from said image projection lens from reaching said reflective spatial image modulator, wherein said optical isolator is capable of restricting reflections frown said optical isolator from reaching said reflective spatial image modulator.

10. The method according to claim 9, wherein said optical isolator comprises a quarter wave foil disposed between said polarizing beamsplitter and said image projection lens, wherein said quarter wave foil is capable of restncting reflections from said quarter wave foil from reaching said reflective spatial image modulator.

11. The method according to claim 9, wherein said optical isolator comprises a quarter wave foil laminated to a face of said polarizing beamsplitter.

12. The method according to claim 9, wherein said optical isolator comprises a quarter wave foil disposed between said polarizing beamsplitter and said image projection lens and a linear polarizer disposed between said polarizing beamsplitter and said quarter wave foil, wherein said quarter wave foil and said linear polarizer are capable of restricting reflections from said quarter wave foil and said linear polarizer from reaching said reflective spatial image modulator.

13. The method according to claim 9, wherein said optical isolator comprises a quarter wave foil disposed between said polarizing beamsplitter and said image projection lens and a linear polarizer disposed between said polarizing beamsplitter and said quarter wave foil, wherein said quarter wave foil and linear polarizer are laminated together, and wherein a combination of said laminated quarter wave foil and said laminated linear polarizer is laminated to said polarizing beamsplitter.

14. The method according to claim 9, wherein said image projection lens is confocal to said reflective spatial image modulator.

15. A method for projecting a ghost-suppressed image from a reflective image modulator, comprising the steps of:
   (a) receiving a linearly polarized reflected modulated image from the reflective image modulator;
   (b) directing the linearly polarized reflected modulated image through a circular polarizer toward a projection lens having a reflective surface to produce a circularly polarized beam;

(c) reflecting a portion of the circularly polarized beam from the projection lens back through the circular polarizer to produce a ghost image;

(d) restricting transmission of light passing twice through the circular polarizer, including the ghost image, from reaching the reflective image modulator; and (e) restricting reflections from a surface of said circular polarizer from reaching said reflective spatial image modulator.

16. The method according to claim 15, wherein the linearly polarized reflected modulated image passes through a beamsplitter prior to reaching the circular polarizer.

17. The method according to claim 15, wherein said step of restricting transmission of light passing twice through the circular polarizer, including the ghost image, from reaching the reflective image modulator comprises analyzing a linear polarization state of the light passing twice through the circular polarize with one or more of the group consisting of a polarizing beamsplitter and a linear polarizing film.

18. The method according to claim 16, wherein a beam path between the circular polarizer and beamsplitter is substantially without a refractive air interface.

19. The method according to claim 16, wherein a beam path between the circular polarizer and beamsplitter includes a linear polarizer, substantially without an intervening refractive air interface, further comprising an antireflective coating at a refractive air interface of the bean path exiting the circular polarizer.

* * * * *